(12) United States Patent
Gao et al.

(10) Patent No.: US 11,485,830 B2
(45) Date of Patent: Nov. 1, 2022

(54) POLYCARBONATE COMPOSITE HAVING AN INCREASED PENCIL HARDNESS

(71) Applicant: Covestro Deutschland AG, Leverkusen (DE)

(72) Inventors: Sean Gao, Shanghai (CN); Lily Ren, Shanghai (CN); Li Yang, Shanghai (CN)

(73) Assignee: COVESTRO DEUTSCHLAND AG, Leverkusen (DE)

(*) Notice: Subject to any disclaimer, the term of this patent is extended or adjusted under 35 U.S.C. 154(b) by 608 days.

(21) Appl. No.: 16/473,291

(22) PCT Filed: Dec. 20, 2017

(86) PCT No.: PCT/EP2017/083922
§ 371 (c)(1),
(2) Date: Jun. 25, 2019

(87) PCT Pub. No.: WO2018/122078
PCT Pub. Date: Jul. 5, 2018

(65) Prior Publication Data
US 2020/0148848 A1    May 14, 2020

(30) Foreign Application Priority Data
Dec. 26, 2016    (CN) .......................... 201611271201.0

(51) Int. Cl.
*C08J 7/046* (2020.01)
*C08J 7/043* (2020.01)
*C08J 7/04* (2020.01)

(52) U.S. Cl.
CPC ............ *C08J 7/0427* (2020.01); *C08J 7/043* (2020.01); *C08J 7/046* (2020.01); *C08J 2369/00* (2013.01); *C08J 2483/04* (2013.01)

(58) Field of Classification Search
None
See application file for complete search history.

(56) References Cited

U.S. PATENT DOCUMENTS

| | | | | |
|---|---|---|---|---|
| 3,553,167 A * | 1/1971 | Schnell et al. | ......... | C08G 63/64 528/176 |
| 3,650,808 A * | 3/1972 | Gagnon | ........... | C08J 7/046 428/412 |
| 3,707,397 A * | 12/1972 | Gagnon | ........... | C08J 7/043 428/412 |
| 4,075,173 A * | 2/1978 | Maruyama | .......... | C08G 63/605 528/206 |
| 4,278,804 A * | 7/1981 | Ashby | ............ | C07F 7/1804 556/436 |
| 4,311,823 A * | 1/1982 | Imai | ............... | C08G 63/605 528/181 |
| 4,373,061 A * | 2/1983 | Ching | ............. | C09D 183/04 524/767 |
| 4,410,594 A * | 10/1983 | Olson | ............. | C08J 7/046 428/412 |
| 4,982,014 A * | 1/1991 | Freitag | ........... | C08G 64/06 568/721 |
| 5,041,313 A * | 8/1991 | Patel | ............. | B05D 7/532 427/379 |
| 5,672,645 A | 9/1997 | Eckel et al. | | |
| 2007/0009741 A1 * | 1/2007 | Boven | ............. | B32B 27/08 428/412 |
| 2020/0148848 A1 * | 5/2020 | Gao | ............... | C08J 7/046 |

FOREIGN PATENT DOCUMENTS

| | | |
|---|---|---|
| CA | 1100681 A | 5/1981 |
| CN | 1133312 A | 10/1996 |
| DE | 1495626 B1 | 6/1971 |
| DE | 2232877 A1 | 1/1974 |
| DE | 2703376 A1 | 8/1977 |
| DE | 2714544 A1 | 10/1977 |
| DE | 3000610 A1 | 7/1980 |
| DE | 3832396 A1 | 2/1990 |
| EP | 0363608 A1 | 4/1990 |
| EP | 0640655 A2 | 3/1995 |
| EP | 0845302 A1 | 6/1998 |
| EP | 1087001 A2 | 3/2001 |
| JP | 08-245817 A | 9/1996 |
| JP | H08300568 A | 11/1996 |

(Continued)

OTHER PUBLICATIONS

Silfor AS4000 TDS (Year: 2021).*
Google scholar—TMCPC And glass transition (Year: 2021).*
Innovation Q plus—IP.com—PG Pub search (Year: 2021).*
International Preliminary Report on Patentability received for PCT Patent Application No. PCT/EP2017/083922, dated Jul. 11, 2019, 9 pages.
International Search Report for PCT/EP2017/083922 dated Mar. 13, 2018.
Written Opinion of the International Searching Authority for PCT/EP2017/083922 dated Mar. 13, 2018.

* cited by examiner

*Primary Examiner* — Peter A Salamon
(74) *Attorney, Agent, or Firm* — Faegre Drinker Biddle & Reath LLP

(57) ABSTRACT

The present invention relates to a polycarbonate composite having an increased pencil hardness, comprising a polycarbonate substrate prepared from a thermoplastic aromatic (co)polycarbonate having a glass-transition temperature in the range of 160 to 210° C.; and a coating on said substrate, said coating being formed by curing a polysiloxane-based thermosetting coating material at a temperature in the range of 140 to 210° C. for 0.5 to 2 hours. The polycarbonate composite has a pencil hardness higher than H, as measured according to ASTM D3363. The present invention also relates to a method for producing said polycarbonate composite and an article comprising the same.

10 Claims, No Drawings

(56) References Cited

FOREIGN PATENT DOCUMENTS

| | | |
|---|---|---|
| JP | 10-180183 A | 7/1998 |
| JP | 2003191371 A | 7/2003 |
| JP | 3474964 B2 | 12/2003 |
| JP | 2006-051608 A | 2/2006 |
| JP | 2009-500195 A | 1/2009 |
| JP | 2011-121304 A | 6/2011 |
| JP | 2014015493 A | 1/2014 |
| WO | WO-9955772 A1 | 11/1999 |
| WO | 2016/063889 A1 | 4/2016 |

POLYCARBONATE COMPOSITE HAVING AN INCREASED PENCIL HARDNESS

CROSS-REFERENCE TO RELATED APPLICATIONS

This application is a national stage application (under 35 U.S.C. § 371) of PCT/EP2017/083922, filed Dec. 20, 2017, which claims benefit of Chinese Application No. 201611271201.0, filed Dec. 26, 2016, both of which are incorporated herein by reference in their entirety.

TECHNICAL FIELD

The present invention relates to a polycarbonate composite having an increased pencil hardness, which comprises a polycarbonate substrate prepared from a thermoplastic aromatic (co)polycarbonate having a glass-transition temperature in the range of 160 to 210° C., and a coating on said substrate, said coating being formed by curing a polysiloxane-based thermosetting coating material at a temperature in the range of 140 to 210° C. for 0.5 to 2 hours. The polycarbonate composite has a pencil hardness higher than H, as measured according to ASTM D3363. The present invention also relates to a method for producing the polycarbonate composite and an article comprising the same.

BACKGROUND ART

Polycarbonates and alloys thereof are excellent in mechanical and optical properties, thermal stability, and processability, and thus have been widely used in industries. However, their scratch resistance is normally poor, therefore a hard coating is usually applied on their surfaces to improve the scratch resistance and pencil hardness thereof. At present, such kind of products typically have a pencil hardness of F and are not suitable for use in some fields having a higher requirement on the pencil hardness (for example, higher than H).

It is well known in the art that higher pencil hardness can be obtained by elevating the curing temperature. However, polycarbonate products normally have a glass-transition temperature in the range of about 140 to about 148° C., and they can be softened in such a temperature range, which limits the application of coating systems that need to be cured at a higher temperature on polycarbonate substrates. In addition, even if a polycarbonate product can withstand such a higher temperature, the relatively greater internal stress usually generated during the molding process, such as injection molding, extrusion molding and the like, within the article produced will cause a warpage of the article at high temperatures, leading to a final product that cannot work properly.

Thus, there is still a need in the art for a polycarbonate composite having a higher pencil hardness and preferably a good appearance.

SUMMARY OF THE INVENTION

In one aspect, the present invention provides a polycarbonate composite, comprising:
a) a polycarbonate substrate, prepared from a thermoplastic aromatic (co)polycarbonate having a glass-transition temperature in the range of 160 to 210° C.; and
b) a coating on said polycarbonate substrate, said coating being formed by curing a polysiloxane-based thermosetting coating material at a temperature in the range of 140 to 210° C. for 0.5 to 2 hours;
wherein said polycarbonate composite has a pencil hardness higher than H, as measured according to ASTM D3363.

Preferably, the polycarbonate substrate is prepared by an injection compression molding process.

In some embodiments of the present invention, the thermoplastic aromatic (co)polycarbonate has a weight-average molecular weight of at least 15,000 g/mol and comprises a structural unit of formula (I),

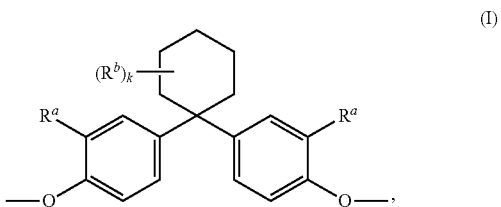

wherein
$R^a$ and $R^b$, independently of each other, represent hydrogen or C1-C4-alkyl,
k represents 0, 1, 2, 3 or 4.

Preferably, the structure unit of formula (I) has the following structure (IX),

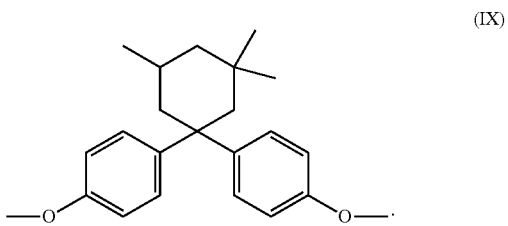

In other embodiments of the present invention, the coating has a thickness in the range of 5 to 40 µm.

In further embodiments of the present invention, the polycarbonate composite is transparent.

In another aspect, the present invention provides a method for producing the above polycarbonate composite, comprising:
I) providing a polycarbonate substrate prepared from a thermoplastic aromatic (co)polycarbonate having a glass-transition temperature in the range of 160 to 210° C.; and
II) applying a polysiloxane-based thermosetting coating material onto the polycarbonate substrate, and then curing at a temperature in the range of 140 to 210° C. for 0.5 to 2 hours, to produce said polycarbonate composite.

In a further aspect, the present invention provides an article produced from the above polycarbonate composite.

Preferably, the article is selected from the group consisting of housings of electronic or electrical equipment, instrument panels, touch screens, display screens and lenses.

DETAILED DESCRIPTION OF THE INVENTION

In an aspect, the present invention provides a polycarbonate composite, comprising:
a) a polycarbonate substrate, prepared from a thermoplastic aromatic (co)polycarbonate having a glass-transition temperature in the range of 160 to 210° C.; and b) a coating on said polycarbonate substrate, said coating being formed by curing a polysiloxane-based thermosetting coating material at a temperature in the range of 140 to 210° C. for 0.5 to 2 hours;

wherein said polycarbonate composite has a pencil hardness higher than H, as measured according to ASTM D3363.

In some embodiments of the present invention, the polycarbonate substrate is prepared from a thermoplastic aromatic (co)polycarbonate having a glass-transition temperature (Tg) in the range of 160 to 210° C., as measured by Differential Scanning calorimetry (DSC) according to standard DIN EN 61006 at a heating rate of 10 K/min, in which Tg is defined as the midpoint temperature (determined by the tangent method). The thermoplastic aromatic (co)polycarbonate can be those commonly used in the art, as long as its glass-transition temperature is in the range of 160 to 210° C.

Preferably, the thermoplastic aromatic (co)polycarbonate has a weight-average molecular weight of at least 15,000 g/mol and comprises a structural unit of formula (I),

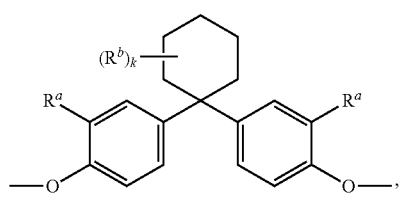

(I)

wherein $R^a$ and $R^b$, independently of each other, represent hydrogen or C1-C4-alkyl, k represents 0, 1, 2, 3 or 4.

As used herein, the term "C1-C4-alkyl" represents, for example, such as methyl, ethyl, n-propyl, isopropyl, n-butyl, sec-butyl, or t-butyl. Meanwhile, the term "C1-C6-alkyl" represents, for example, such as n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, or 1-ethyl-2-methylpropyl. In addition, the term "C1-C11-alkyl" represents, for example, such as n-heptyl, n-octyl, pinakyl, adamantyl, isomeric menthyl, n-nonyl, n-decyl, or n-undecyl. Furthermore, the term "C1-C34-alkyl" represents, for example, such as n-dodecyl, n-tridecyl, n-tetradecyl, n-hexadecyl, or n-octadecyl. The above also applies to the corresponding alkyl group in, for example, aralkyl or alkylaryl, alkylphenyl or alkylcarbonyl. The alkylene group in corresponding hydroxyalkyl or aralkyl/alkylaryl represents, for example, the alkylene derived from the corresponding alkyl as defined above.

As used herein, the term "alkenyl" represents a linear, cyclic or branched alkenyl having preferably 2-11 (C2-C11), and more preferably 2-6 (C2-C6) carbon atoms. Examples of the alkenyl are vinyl, allyl, isopropenyl and n-but-2-en-1-yl.

The term "aryl" represents a carbocyclic aryl having 6-34 carbon atoms in its backbone. This also applies to the aromatic moiety of arylalkyl, also referred to as aralkyl, and applies to the aryl moiety of complex groups, such as arylcarbonyl.

Examples of C6-C34 aryl are phenyl, o-, p-, m-tolyl, naphthyl, phenanthryl, anthryl or fluorenyl.

The terms "arylalkyl" and "aralkyl", independently of each other, represent a linear, cyclic, branched or unbranched alkyl as defined above, that is mono-, multi- or fully substituted by an aryl as defined above.

Preferably, the structure unit of formula (I) has the following structure (IX),

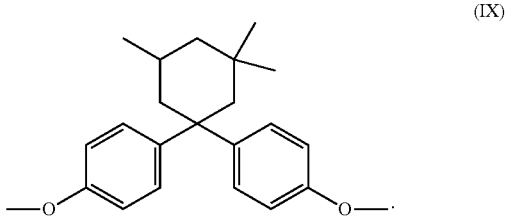

(IX)

The above lists are illustrative only and should not be considered to be limiting.

As used herein, the term "thermoplastic aromatic (co)polycarbonate" covers both homopolycarbonates and copolycarbonates constituted by different diphenol units. In the contents of the present application, the term "(co)polycarbonate" also covers homopolycarbonates of a diphenol unit represented by the formula (V),

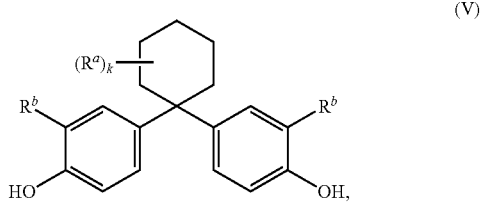

(V)

wherein $R^a$ and $R^b$, independently of each other, represent hydrogen or C1-C4-alkyl, preferably methyl, and k represents 0, 1, 2, 3 or 4, preferably 2 or 3.

Aromatic (co)polycarbonates suitable for use in the present invention are described in published references or can be prepared according to the methods as described in published references (the preparation of aromatic (co)polycarbonates can be seen, for example, in "Chemistry and Physics of Polycarbonates", Schnell, Interscience Publishers, 1964, and DE-AS1495626, DE-A2232877, DE-A2703376, DE-A2714544, DE-A3000610, and DE-A3832396).

The preparation of the aromatic (co)polycarbonate can be carried out, for example, by conducting the reaction of a diphenol and a carbonyl halide compound, preferably phosgene, according to the phase interface method, optionally with the use of a chain terminator, such as monophenol, and further optionally with the use of a branching agent having three or more functionality, such as triphenol or tetraphenol.

Dihydroxyl aromatic compounds suitable for use in the preparation of the (co)polycarbonate are those of formula (VI),

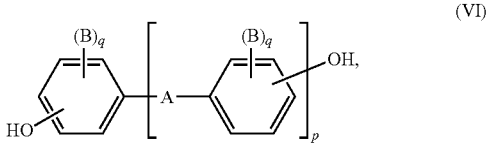

(VI)

wherein,

A represents a single bond, C1-C5-alkylene, C2-C5-alkylidene, C5-C6-cycloalkyl, —O—, —SO—, —CO—, —S—, —SO$_2$—, C6-C12-arylene, which can be fused with an additional aromatic ring comprising optionally a heteroatom, or a group of formula (VII) or (VIII),

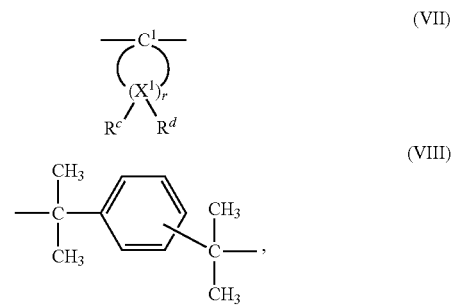

(VII)

(VIII)

B represents for each occurrence hydrogen, C1-C12-alkyl, preferably methyl, or halogen, preferably chlorine and/or bromine, q represents independently for each occurrence 0, 1 or 2, p is 1 or 0, and $R^c$ and $R^d$, selected independently for each X1 and independently of each other, represent hydrogen or C1-C6-alkyl, preferably hydrogen, methyl or ethyl, X1 is carbon, and r represents an integer of 4-7, preferably 4 or 5, with the proviso that the $R^c$ and $R^d$ on at least one atom X1 are both alkyl.

As a diphenol derived from the formula (V), 1,1-bis-(4-hydroxyphenyl)-3,3,5-trimethylcyclohexane (bisphenol TMC) is preferably used in the preparation of the (co) polycarbonate according to the present invention.

Diphenols of formula (VI) suitable for use in the preparation of the (co)polycarbonate according to the present invention are, for example, such as hydroquinone, resorcin, bis(hydroxyphenyl)alkane, bis(hydroxyphenyl)thioethers, bis(hydroxyphenyl)ethers, bis(hydroxyphenyl)ketones, bis (hydroxyphenyl)sulphones, bis(hydroxyphenyl)sulfoxides, α,α'-bis(hydroxyphenyl)diisopropylbenzenes and alkylated, ring-alkylated and ring-halogenated derivatives thereof.

Other preferred diphenols are 4,4'-dihydroxybiphenyl, 2,2-bis-(4-hydroxyphenyl)-1-phenylpropane, 1,1-bis-(4-hydroxyphenyl)phenylethane, 2,2-bis-(4-hydroxyphenyl)propane, 2,2-bis-(3-methyl-4-hydroxyphenyl)propane, 2,4-bis-(4-hydroxyphenyl)-2-methylbutane, 1,3-bis-[2-(4-hydroxyphenyl)-2-propyl]benzene (bisphenol M), 2,2-bis-(3-methyl-4-hydroxyphenyl)propane, bis(3,5-dimethyl-4-hydroxyphenyl)methane, 2,2-bis-(3,5-dimethyl-4-hydroxyphenyl)propane, bis-(3,5-dimethyl-4-hydroxyphenyl)sulphone, 2,4-bis-(3,5-dimethyl-4-hydroxyphenyl)-2-methylbutane, and 1,3-bis-[2-(3,5-dimethyl-4-hydroxyphenyl)-2-propyl]benzene.

Particularly preferred diphenols are 2,2-bis-(4-hydroxyphenyl)propane (BPA) and 2,2-bis-(3-methyl-4-hydroxyphenyl)propane (dimethyl-BPA).

Particularly preferred is the (co)polycarbonate of bisphenol A and bisphenol TMC.

Said diphenols can be used alone or in any mixtures. These diphenols are described in published references or can be prepared according to the methods as described in published references.

These and other suitable diphenols are commercially available and described, for example, in "Chemistry and Physics of Polycarbonates", H. Schnell, Interscience Publishers, New York, 1964, 28ff, and 102ff, and "Handbook of Polycarbonate Science and Technology", D. G. Legrand, J. T. Bendler, Marcel Dekker publisher, New York, 2000, 72ff.

Suitable chain terminators for use in the preparation of the thermoplastic aromatic (co)polycarbonate are, for example, phenol, p-tert-butylphenol or cumyl phenol.

The chain terminator is normally used in an amount of 0.5 mol % to 10 mol %, based on the total moles of the diphenols used in each case.

The thermoplastic aromatic (co)polycarbonate can be branched in known ways, particularly and preferably by incorporating a compound with three or more functionality, such as a compound having three or more phenolic groups, in an amount of 0.05-2.0 mol %, based on the total amount of the diphenols used.

In a preferred embodiment of the present invention, the aromatic (co)polycarbonate has a weight-average molecular weight (Mw, as measured by, for example, GPC, ultracentrifugation, or light scattering) of more than 15,000 g/mol, and preferably between 20,000 g/mol and 50,000 g/mol.

The thermoplastic aromatic (co)polycarbonate can be used alone or in any mixtures (preferably with other aromatic polycarbonate(s)).

The diphenol used, like all other chemicals and adjuvants added during the production, may be contaminated with impurities derived from its synthesis, processing or storage. However, it is desirable to use start materials as pure as possible.

In addition to the thermoplastic aromatic (co)polycarbonate as described above, additives can be added optionally during the preparation of the polycarbonate substrate, provided that the corresponding performance of the polycarbonate substrate will not be impaired. The additives include, but not limit to, UV-absorbers, demolding adjuvants, heat stabilizers, flame retardants, flame retardant synergists, anti-dripping agents (such as compounds in the family of fluorinated polyolefin, siloxane, and aramid fiber species), lubricants and demolding agents (such as pentaerythritol tetrastearate), nucleators, stabilizers, and anstatic agents (such as conductive carbon black, carbon fiber, carbon nanotube and organic anstatic agent, such as polyalkylene ether, alkyl sulfonate or polyamide-containing polymer), as well as dyes and pigments.

Besides, inorganic fillers, such as glass fibers, and carbon fibers, can be added as an additive. Pigments, such as titanium dioxide, quartz (silica) or barium sulfate, can also be added as an additive.

As the flame retardant, a phosphorous flame retardant, especially a flame retardant selected from the group consisting of monomeric and oligomeric phosphate and phosphonate, phosphonate amine and phosphazene, is preferably used, and a mixture of two or more selected from the above group can also be used. Other phosphorous compounds, preferably halogen-free phosphorous compounds, not specifically mentioned herein can also be used alone or in any combination with other phosphorous compounds that are preferably halogen-free. Examples of suitable phosphorous compounds are tributyl phosphate, triphenyl phosphate, tricresyl phosphate, diphenyl cresyl phosphate, diphenyl octyl phosphate, diphenyl 2-ethylcresyl phosphate, tri(isopropylphenyl) phosphate, resorcin-bridged diphosphate or oligomeric phosphate and bisphenol A-bridged diphosphate or oligomeric phosphate. The oligomeric phosphate derived from bisphenol A is particularly preferably used. Phosphorous compounds suitable for use as the flame retardant are known (see, for example, EP-A0363608, EP-A0640655) or can be prepared in a similar way according to known methods (see, for example, Ullmanns Enzyklopädie der technischen Chemie, vol 18, 301ff, 1979; Houben-Weyl, Methoden der organischen Chemie, vol 12/1, page 43; Beilstein, vol 6, page 177).

Additives can be added to improve the service life or color (e.g. stabilizer) of the product, make processing easier (e.g. demolding agent, flow promotor, antistatic agent) or adjust the performance of the polymer under load (e.g. impact modifier, such as rubber; flame retardant, colorant, glass fiber).

The additives can be added to the polymer melt alone or in any mixture or different mixtures, in particular, directly upon separating the polymer or after the melting of the granules during the so-called blending process. The additives or mixtures thereof can hereby be added to the polymer melt as a solid, i.e. as powders, or as a melt. Another way for metering the additive is to use a masterbatch or a mixture of masterbatch of an additive or a mixture of additives.

Suitable additives are described, for example, in "Additives for Plastics Handbook", John Murphy, Elsevier, Oxford, 1999 and "Plastics Additives Handbook", Hans Zweifel, Hanser, Munich, 2001 or WO99/55772, pages 15-25.

Suitable heat stabilizers are preferably tri-(2,4-di-t-butylphenyl) phosphite (Irgafos 168), tetra-(2,4-di-t-butylphenyl)[1,1-diphenyl]-4,4'-diyl bisphosphonate, triisooctyl phosphate, octadecyl-3-(3,5-di-t-butyl-4-hydroxyphenyl) propionate (Irganox1076), bis-(2,4-dicumylphenyl) pentaerythritol diphosphite (DoverphosS-9228-PC), bis-(2,6-di-t-butyl-4-methylphenyl) pentaerythritol diphosphite (ADKSTABPEP-36) or triphenyl phosphine. They can be used alone or in mixtures (for example, IrganoxB900 or DoverphosS-9228-PC with IrganoxB900 or Irganox1076).

Suitable demolding agents are preferably pentaerythritol tetrastearate, glyceryl monostearate, stearyl stearate, or propylene glycol monostearate or distearate. They can be used alone or in mixtures.

Suitable UV stabilizers are preferably 2-(2'-hydroxyphenyl) benzotriazoles, 2-hydroxy benzophenones, substituted or unsubstituted esters, acrylates, hindered amines, oxalamide, 2-(2-hydroxyphenyl)-1,3,5-triazines, and more preferably substituted benzotriazoles, such as Tinuvin360, Tinuvin234, Tinuvin329, Tinuvin1600 or Tinuvin312 (products of BASF SE, Ludwigshafen).

In addition, colorants, such as organic dyes or pigments or inorganic pigments, IR absorbers can be added alone, or in mixtures, or in combination with stabilizers, (hollow) glass spheres, inorganic fillers or organic or inorganic diffusion pigments.

In some embodiments of the present invention, the polycarbonate substrate can be prepared from the above polycarbonate composition according to methods known in the art, for example, but not limit to, injection molding, extrusion, blow molding and the like.

As used herein, the term "injection molding" refers to a process performed using an injection molding machine, in which specified materials or modeling materials are plasticated in an injection unit, injected into an injection mold and then molded. The shape and the surface structure of the final component are determined by the characterics of the hollow portion, i.e. the cavity, of the mold. The injection molding covers all injection molding methods, such as multi-components injection molding and injection compression molding.

Preferably, the polycarbonate substrate is prepared by an injection compression molding process. It is well known in the art that the injection compression molding is different from conventional injection molding processes, as it combines injection molding and compression molding together, in which when the mold is closed for the first time during the molding process, the moving half and the cover half are not closed completely so as to leave a gap for compression; the melt is then injected into the mold cavity; and after the completion of the melt injection, the mold is closed completely to compress the melt in the mold cavity. The applicant is surprised to find that the polycarbonate substrate produced by such a process does not undergo any warping deformation and therefore is particularly suitable for the polycarbonate composite of the present invention.

The polycarbonate composite of the present invention further comprises a coating applied on the polycarbonate substrate. The coating is formed by curing a polysiloxane-based thermosetting coating material at a curing temperature in the range of 130 to 210° C.

The polysiloxane-based thermosetting coating material is described in details in U.S. Pat. Nos. 4,278,804, 4,373,061, 4,410,594, 5,041,313 and EP-A-1 087 001, the examples including coating systems commercially available from Momentive Performance Materials Inc (Wilton, Conn. USA), such as PHC 587, PHC 587B, PHC 587C, PHC XH100, and KASI or Sun, both available from KRD Coatings (Geesthacht, Germany), or MP 100 available from SDC Coatings, or MRL available from GFO (Gmünd, Germany).

The coating can be a single layered or multilayered coating. Where the coating is a multilayered coating, at least one of its layers is formed from the polysiloxane-based thermosetting coating material. In a particular embodiment of the present invention, a finish coat layer formed from the siloxane-based thermosetting coating material is provided, and a prime coat layer is further provided between the finish coat layer and the substrate to improve the adhesion.

The polysiloxane-based thermosetting coating material can be applied onto the polycarbonate substrate by methods commonly used in the art, including, but not limit to, spray coating, curtain coating, bar coating, blade coating, roll coating and dip coating. Preferably, the polysiloxane-based thermosetting coating material is applied on the polycarbonate substrate by spray coating.

After the completion of coating, the coated article is cured at a curing temperature in the range of 140 to 210° C. for 0.5 to 2 hours, allowing a complete curing of the polysiloxane-based thermosetting coating material, so as to produce the polycarbonate composite of the present invention. Preferably, the coated article is cured at a curing temperature in the range of 170 to 210° C. for 0.5 to 1 hours and, under such conditions, polycarbonate composites with a higher pencil hardness can be obtained.

The coating of the polycarbonate composite provided in the present invention may have a thickness in the range of 5 to 40 μm, and preferably in the range of 10 to 40 μm. In an embodiment of the present invention, where the coating has a thickness in the range of 10 to 25 μm, the polycarbonate composite obtained has a higher pencil hardness.

Preferably, the polycarbonate composite of the present invention is transparent. As used herein, the term "transparent" means that the polycarbonate composite has a transmissivity of at least 88%, preferably at least 90%, and more preferably 91% to 92%, in the visible range (550 to 750 nm), wherein the transmissivity is determined according to ASTM E 1348: "Standard Test Method for Transmittance and Color by Spectrophotometry Using Hemispherical Geometry" and the uncoated substrate has a thickness of 3 mm.

In another aspect, the present invention provides a method for producing the above polycarbonate composite, comprising:

I) providing the polycarbonate substrate as described above; and

II) applying the polysiloxane-based thermosetting coating material on the polycarbonate substrate, and then curing at a curing temperature in the range of 140 to 210° C. for 0.5 to 2 hours, to produce said polycarbonate composite.

Preferably, the coated article is cured at a curing temperature in the range of 170 to 210° C. for 0.5 to 1 hours, to produce the polycarbonate composite according to the present invention.

In a further aspect, the present invention provides an article produced from the above polycarbonate composite. Preferably, the article is selected from the group consisting of housings of electronic or electrical equipment, instrument panels, touch screens, display screens and lenses. The electronic or electrical equipment include, but not limit to, smartphones, mobile computers and televisions.

EXAMPLES

The starting materials used in the examples of the present invention are as follows:

SilFORT* PHC XH100: a polysiloxane-based thermosetting coating material, purchased from Momentive Inc.;

Polycarbonate substrate 1: prepared from a thermoplastic aromatic copolycarbonate made of bisphenol TMC and bisphenol A from Covestro Deutschland AG, Leverkusen, having a MVR (melt volume rate) of 5.3 cm/10 min (330° C., 2.16 kg (measured in accordance with ISO 1133 (DIN EN ISO 1133-1:2012-03)) and having a Tg of 200° C. using the injection compression molding process, Polycarbonate substrate 2: prepared from a thermoplastic aromatic polycarbonate made of bisphenol A having a Tg of 144° C. using the conventional injection molding process.

Example 1

Polycarbonate substrates 1 and 2 with a size of 150× 100×3 mm were provided, coated with SilFORT* PHC XH100, respectively, by spray coating, and placed at room temperature for 15 minutes, allowing the coating surface to reach a tack-free state. Then, the coated substrates were placed in a hot air circulating oven for curing. The time and temperature applied for curing are recorded in Table 1, with all coatings having the same thickness of 6 μm.

TABLE 1

Preparation of the Polycarbonate Composites

| | Substrate | Curing temperature (° C.) | Curing time (h) | Pencil hardness |
|---|---|---|---|---|
| Example 1 | polycarbonate substrate 1 | 130 | 0.5 | HB |
| Example 2 | polycarbonate substrate 1 | 130 | 1 | HB |
| Example 3 | polycarbonate substrate 1 | 180 | 0.5 | H |
| Example 4 | polycarbonate substrate 1 | 180 | 1 | H |
| Comparative Example 1 | polycarbonate substrate 2 | 130 | 0.5 | HB |
| Comparative Example 2 | polycarbonate substrate 2 | 130 | 1 | HB |

In Example 1 and Example 2, polycarbonate substrate 1 was cured at 130° C. for 0.5 h or 1 h, and only a pencil hardness of HB was obtained in both cases; in Example 3 and Example 4, polycarbonate substrate 1 was cured at 180° C. for 0.5 h or 1 h, and a pencil hardness of H was obtained in both cases, and meanwhile no warpage was visually observed after baking at 180° C. for 1 h.

In Comparative Example 1 and Comparative Example 2, polycarbonate substrate 2 was cured at 130° C. for 0.5 h or 1 h, and only a pencil hardness of HB can be obtained in both cases. Moreover, it was visually observed that polycarbonate substrate 2 had undergone warpage under the curing temperature.

Example 2

Polycarbonate substrate 1 was provided, coated with SilFORT* PHC XH100 by spray coating, and placed at room temperature for 15 minutes, allowing the coating surface to reach a tack-free state. Then, the coated substrate was placed in a hot air circulating oven for curing at a temperature of 180° C. for 1 h.

TABLE 2

Influence of the Coating Thickness on Pencil Hardness

| | Coating thickness (μm) | Pencil hardness |
|---|---|---|
| Example 4 | 6 | H |
| Example 5 | 9 | H |
| Example 6 | 11 | 2H |
| Example 7 | 15 | 2H |
| Example 8 | 20 | 2H |

As can be seen from Table 2, a higher coating thickness is favorable for increasing the pencil hardness, especially in the case where the thickness is higher than 10 μm.

The invention claimed is:

1. A polycarbonate composite, comprising:
   a) a polycarbonate substrate, prepared from a thermoplastic aromatic (co)polycarbonate having a glass-transition temperature in the range of 160 to 210° C.; and
   b) a coating on said polycarbonate substrate, said coating being formed by curing a polysiloxane-based thermosetting coating material at a temperature in the range of 180 to 210° C. for 0.5 to 2 hours and the thickness of the coating is from 11 μm to 40 μm;
   wherein said polycarbonate composite has a pencil hardness higher than 2H, as measured according to ASTM D3363, and wherein said thermoplastic aromatic (co)polycarbonate has a weight-average molecular weight of at least 15,000 g/mol, and comprises a structure unit of formula (I),

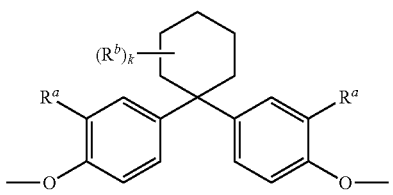

wherein
$R^a$ and $R^b$, independently of each other, represent hydrogen or C1-C4-alkyl, k represents 1,2, 3 or 4.

2. The polycarbonate composite according to claim 1, wherein said polycarbonate substrate is prepared by an injection compression molding process.

3. The polycarbonate composite according to claim 1, wherein the structure unit of formula (I) has the following structure (IX),

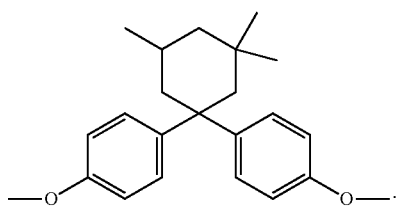

4. The polycarbonate composite according to claim 1, wherein said coating has a thickness in the range of 5 to 40 μm.

5. The polycarbonate composite according to claim 1, wherein said polycarbonate composite is transparent.

6. A method for producing the polycarbonate composite to claim 1, comprising:
I) providing a polycarbonate substrate prepared from a thermoplastic aromatic (co)polycarbonate having a glass-transition temperature in the range of 160 to 210° C.; and
II) applying a polysiloxane-based thermosetting coating material onto the polycarbonate substrate, and then curing at a curing temperature in the range of 140 to 210° C. for 0.5 to 2 hours, to produce said polycarbonate composite.

7. An article produced from the polycarbonate composite according to claim 1.

8. The article according to claim 7, wherein said article is selected from the group consisting of housings of electronic or electrical equipment, instrument panels, touch screens, display screens and lenses.

9. The polycarbonate composite according to claim 1, wherein said thermoplastic aromatic (co)polycarbonate has a weight-average molecular weight of from 15,000 g/mol to 32,000 g/mol.

10. The polycarbonate composite according to claim 1, wherein the copolycarbonate consists of a structure (IX), and a structure derived from bisphenol A

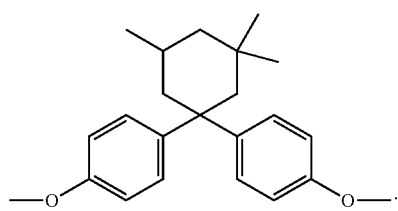

* * * * *